United States Patent Office 2,727,302
Patented Dec. 20, 1955

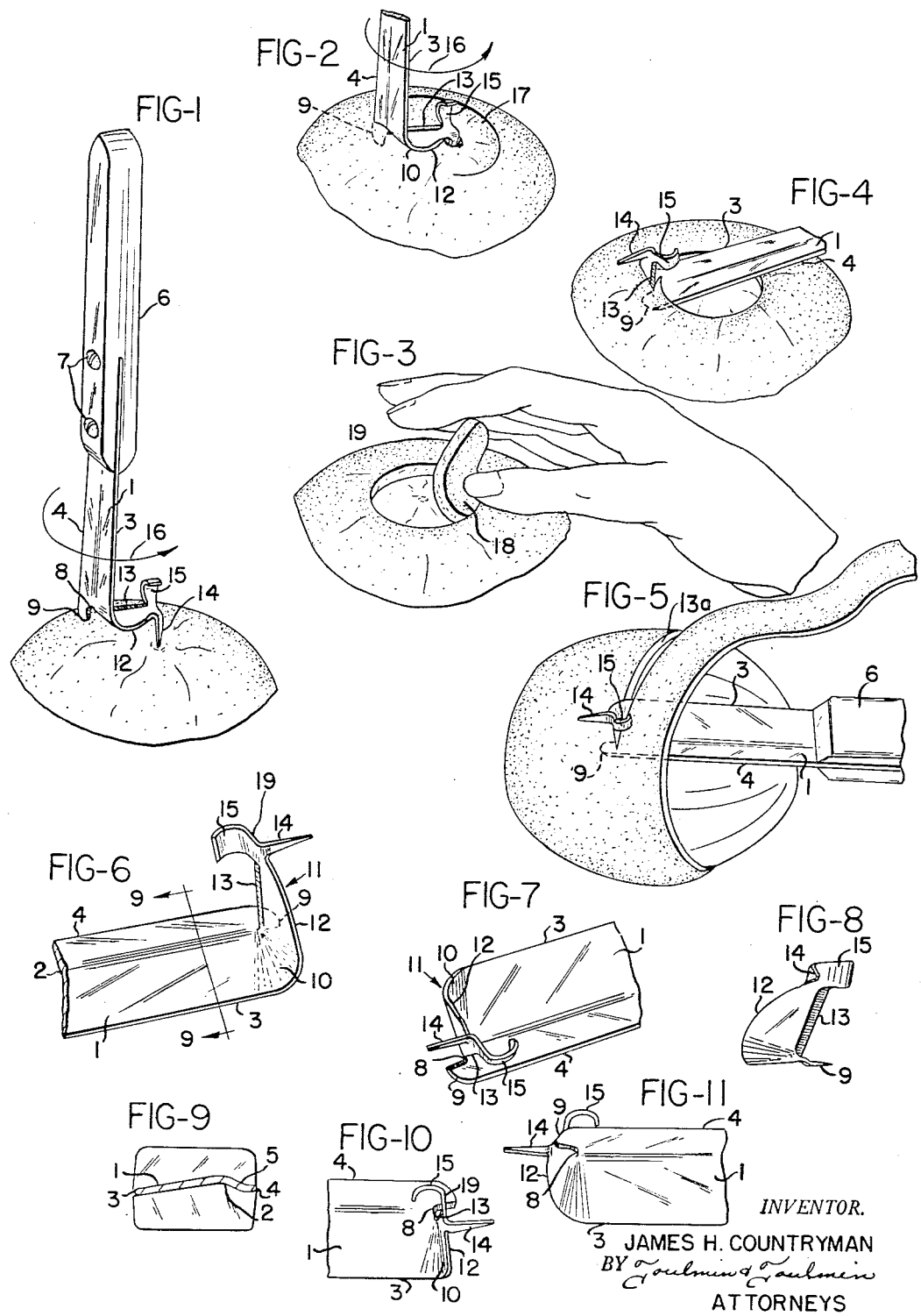

2,727,302

PEELER FOR CITRUS FRUIT

James H. Countryman, Dayton, Ohio

Application December 13, 1952, Serial No. 325,821

1 Claim. (Cl. 30—24)

The present invention relates to devices or articles for removing peel from citrus fruit, and more particularly from oranges.

Various devices have been used for cutting or otherwise removing the peel from an orange, including knives, and even fingernails. Invariably these devices cause mutilation of the pulp, with consequent dropping of juice and with resulting difficulty of cleanly sectionalizing the fruit.

The primary object of the invention is to provide an inexpensive but effective device which can peel an orange or other citrus fruit, such as grapefruit or lemons, in a manner similar to that used in peeling an apple, and without penetrating the juicy pulp.

Another object is to provide a peeler, especially for citrus fruit, which can be operated by hand and in which the peel, when cut, falls into a continuous spiral.

Still another object is to provide a peeler for citrus fruit by which the peel can be separated from the thin membrane encasing the pulp, thus leaving this membrane intact and preventing escape of the juice.

Still another object is to provide a peeler for citrus fruit, especially oranges, which exercises a combined wedging and cutting effect to separate the peel in a dry state from the pulp of the fruit.

Another object is to provide a peeler for citrus fruit which operates mainly on the prying or wedging principle, requiring unsharpened or blunt edges except for a sharpened portion of limited size, which portion is protected by the general contour of the peeler.

Another object is to provide a peeler which operates mainly on the principle of prying or wedging the peel away from the pulp, but which requires a cutting operation at the start of the prying operation, the peeler serving to provide both of these operations in the form of an inexpensive and easy to operate tool.

Other objects and features are carried out, in brief, by providing a metal plate attached to a handle, this plate carrying a small knife or cutting portion at the end of a longer blunted blade portion which serves to pry the peel away from the pulp and to sever the separated peel into a continuous strip of uniform width. The strip of peel may be dried or treated and used for decorative and garnishing purposes.

Other objects and features will be apparent as the specification is perused in connection with the accompanying drawings, in which:

Figure 1 represents a perspective view of the peeler, showing the first operation in removing the peel;

Figure 2 is a view similar to Figure 1, but illustrating the operation of cutting the boundary line of the circular disc which is to be removed from the peel of the fruit;

Figure 3 depicts the manner in which the disc can be removed by the fingers in order to provide a starting point for the peel-prying operation;

Figure 4 shows the start of the peel-prying or cutting operation after the disc of peel has been removed;

Figure 5 is a view similar to Figure 4 and showing the operation of the tool as the peeling proceeds;

Figure 6 depicts an enlarged perspective view, in fragmentary form, of the details of the tool;

Figure 7 shows still other details of the tool but looking in a different direction from the view shown in Figure 6;

Figure 8 illustrates the end view of the tool;

Figure 9 is a section taken along line 9—9 in Figure 6;

Figure 10 represents a fragmentary detail of the end portion of the tool; and

Figure 11 is a view looking at the underside of the tool, at one end thereof.

Referring to Fig. 1, reference character 1 designates a metal blade, preferably made of stainless steel, with parallel blunted edges. The metal has a minimum thickness as rigidly to retain its shape, but not so thick as to introduce difficulty in prying the peel away from the pulp, as will be described hereinafter. I have found that a thickness of $\frac{1}{32}''$ to $\frac{3}{64}''$ will suffice.

The blade can conveniently be made approximately $\frac{1}{2}''$ wide, although it will be understood that these dimensions are purely for exemplary reasons. The blade is given a slight concave configuration, as indicated at 2 in Fig. 9, the peak of this concavity being preferably located at approximately one-third the width of the blade, for reasons which will be brought out hereinafter.

This peaked effect extends for substantially the entire length of the blade and, as shown in Fig. 9, the slope from the edge 3 to the peak 2 is substantially straight, but the slope from the peak 2 to the edge 4 has a reverse concavity indicated at 5. One end of the blade 1 is rendered perfectly flat and for convenience it is inserted within a slot formed in a handle 6 to which it is secured by screws or rivets 7.

The end of the blade opposite from the handle 1 is provided with a short longitudinal slot indicated at 8 in Fig. 10, this slot being positioned approximately one-third of the width of the blade and positioned nearer the edge 4, which will be designated hereinafter as the leading edge. The slot may extend longitudinally into the blade for a distance of approximately $\frac{1}{8}''$, although I am not limited to this dimension, and the end of the projection thus formed is rounded over as indicated at 9 in Fig. 7. The inner edge, i. e. nearer the slot 8, is made sharp as this edge performs a cutting operation, as will be described hereinafter.

That portion of the blade which is on the opposite side of the slot 8 from the knife projection 9 is bent upwardly over a radius of varying diameter, as indicated at 10 in Fig. 6, with the largest diameter of radius nearer the edge 3, giving the effect of the end portion designated generally at 11 extending edgewise over the blade and away from the edge 3. The edge 12 of the end portion 11 is given a curvilinear configuration, this edge portion constituting a continuation of the edge 3.

The opposite edge of the end portion 11, i. e. immediately adjacent the slot 8, projects upwardly at right angles to the blade with a bend of small diameter and extends angularly as well as upwardly to overhang or overlie the knife projection 9. This overhanging edge and the fact that it overlies the knife 9 is more clearly shown at 13 in Fig. 6. This overhanging or oblique edge is sharp so as to constitute a cutting edge, as will also be explained hereinafter.

The end portion 11, at the top (as seen in Fig. 6), terminates into two split portions, one of which, designated at 14, is bent at right angles to the end portion 11 to constitute a pointed element. The other split portion of the end member 11 is caused to project outwardly from the cutting edge 13 and remains in the same plane as the end member 11 except for a curled-back end, indicated at 15, which serves as a guard to prevent the fingers from reaching the cutting edge 13. The pointed element may extend outwardly for approximately ¼".

It is apparent that the formation of the cavities 2 and 5 and the bending up step of the end element 11 and the provision for the pointed element 14 and the curved guard element 15 can all be obtained by simple punching and pressing operations, so that the blade as a whole is quite inexpensive to make.

In operation, the pointed element 14 is first punched or pressed into the end of the orange until the end portion 11 comes into contact with the peel. The peeler is then rotated counter-clockwise as indicated by the arrow 16, in Fig. 1, with the small knife projection 9 cutting its way into the rind or peel. The projection 9 will eventually cut out the boundary 17 of a disc 18 which has a diameter substantially twice the distance between the pointed element 14 and the knife projection 9. This distance is approximately ½" so that the disc as cut out will approximate ⅞" to 1" in diameter.

The disc can be easily lifted by the fingers, particularly if the oranges are fairly fresh, leaving exposed the white membrane which contains the juicy pulp of the fruit. The next step is to then insert the knife projection 9 as a wedging action into the inter-cellular space between the peel and the pulp at the boundary 17 and the peeler is then given a circular peeling motion while being held flat against the orange, with a slight movement downwardly toward the middle of the fruit. This operation is shown more clearly in Fig. 4.

The projection 9 remains inserted between the adhering peel and the pulp as the tool is moved around the orange in the manner shown in Fig. 5. As the peeling proceeds, the blade 2 is held in light contact with the puly and the knife edge cleanly cuts the inner edge of the peel as indicated at 13a which had previously been loosened and raised slightly from the pulp by the projection 9. The latter may be considered as a pre-conditioning agent in preparing the peel for the edge-severing operation. It also serves to gives stability or a positioning effect to the plate 2 during the peeling operation by anchoring the front end of the plate under the peel.

The leading edge 4 of the plate completes the separation of the peel from the pulp by causing a rolling or folding-over action of the peel as a continuation of the separation initially produced by the projection 9. Thus, the peel is pried away from the pulp and the only cutting effects are those in which the boundary 17 is made by the projection 9 and again when the edge 13a is severed by the cutting surface 13.

Since the depth of the boundary cut is strictly limited by the abutment 11 and further, since the edge severance at 13a is in a direction normal to the surface of the pulp, no part of the plate 2 ever enters the pulp. The white membrane remains intact with the juice self-contained, and the fruit can be dryly sectionalized.

After little experience, knowing how to apply pressure and how to use the prying effect obtained at the leading edge of the blade, it will be found that the peel will leave the orange as a strip of substantially constant width, giving the same effect as if a knife were peeling an apple. However, it will be distinctly understood that the leading edge of the blade 1 does not cut the peel but merely pries it loose from the white membrane of the orange. The width of this strip can be made of any size, depending upon pressure exerted at the leading edge 3 and the flatness with which the blade as a whole is caused to rest upon the white membrane of the orange.

Generally speaking, if both the leading edge 4 and the trailing edge 3 of the blade are permitted to contact the outer skin of the pulp, a peel of approximately ½" wide, and dropping from the orange as a spiral, will be obtained. The concavity 2 assists in the peeling operation in that it accommodates the curvature of the orange and allows a stable support between the blade and the orange at the two edges 3 and 4 during the peeling operation.

The curvature 5 on the blade provides the lifting or wedging effect between the peel and the pulp as the peeler is operated with a circular motion. The larger radius 10 forming part of the edge 3 serves the purpose of allowing this edge to pass over the unpeeled portion, thus permitting a considerable leeway of movement of the handle 6 in the lateral direction without disturbing the severing effect of the blade 13.

While I have described the operation of my improved peeler from the standpoint of cutting a disc only at one end of the orange, it is obvious that if desired, a corresponding disc could be cut at the opposite end of the orange to facilitate the peeling operation. However, I have found that the spiral strip-removing operation, can be carried out even down to the lower button of the orange without the necessity of removing a disc of peel at this point.

The tool is so simple to operate that even in the hands of a novice, a peel of uniform width, as indicated in Fig. 5, can be obtained and this peel can be treated or candied and used for decorative or garnishing purposes.

It is apparent that while I have emphasized the use of the peeler in connection with oranges, it will be understood that the tool can be used for peeling all kinds of citrus fruit, including grapefruit and lemons, with equal facility, in which case a disc is first removed from one end of the fruit, after which the tool is used to pry the peel from the pulp into a continuous spiral strip of uniform width without any mutilation of the pulp of the grapefruit or lemon. It follows that no juice is lost from any of these fruits and the membrane is left so intact after the peeling operation that even when the fruit is sectionalized, there is still no escape of juice.

It will be understood that various modifications and arrangements in structure could be made without departing from the spirit of my invention, and accordingly, I desire to comprehend such modifications and substitutions of equivalents as may be considered to come within the scope of the appended claim.

Having thus fully described my invention, what I claim as new and desire to secure by Letters Patent, is:

A citrus fruit peeler comprising a handle, a blade connected to said handle, the outer end portion of said blade including two split sections, one of said split sections being bent-up at substantially right angles to the plane of said blade at the base of the split between the two split sections, the other section forming a projection of said blade adjacent to said bent-up section, said projection being of less width than said blade and having a sharp cutting edge on its inner side for cutting through the peel of the fruit, said bent-up section terminating in a pointed element which element extends outwardly and substantially parallel to said inner cutting edge and being spaced therefrom by a length along said bent-up section, said pointed element of the blade being adapted to be pressed downwardly into the fruit to bring said inner cutting edge blade projection into position to cut a circular shaped peel portion of the fruit upon rotation of said blade about the axis of said pointed element.

References Cited in the file of this patent

UNITED STATES PATENTS

| | | |
|---|---|---|
| 379,238 | McNeal | Mar. 13, 1888 |
| 379,328 | Porter | Mar. 13, 1888 |
| 528,517 | Mitchell | Oct. 30, 1894 |
| 733,194 | Hall | July 7, 1903 |
| 1,072,243 | Lydick | Sept. 2, 1913 |
| 1,261,954 | Newman | Apr. 9, 1918 |
| 2,258,448 | Gesell | Oct. 7, 1941 |
| 2,549,326 | Moore | Apr. 17, 1951 |
| 2,591,973 | Smith | Apr. 8, 1952 |

FOREIGN PATENTS

| | | |
|---|---|---|
| 10,570 | Great Britain | May 7, 1907 |